(12) United States Patent
Zimmermann

(10) Patent No.: US 11,152,200 B2
(45) Date of Patent: Oct. 19, 2021

(54) INTERFACE DEVICE BETWEEN SAMPLE SEPARATION DEVICE AND MASS SPECTROMETER HAVING MULTIPLE SAMPLE CAPILLARIES

(71) Applicant: Agilent Technologies, Inc., Santa Clara, CA (US)

(72) Inventor: Hans-Peter Zimmermann, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/777,689

(22) Filed: Jan. 30, 2020

(65) Prior Publication Data

US 2020/0251323 A1     Aug. 6, 2020

(30) Foreign Application Priority Data

Feb. 1, 2019 (GB) ...................................... 1901431

(51) Int. Cl.
| | | |
|---|---|---|
| *H01J 49/00* | (2006.01) | |
| *H01J 49/16* | (2006.01) | |
| *G01N 30/72* | (2006.01) | |
| *G01N 30/84* | (2006.01) | |
| *H01J 49/02* | (2006.01) | |
| *H01J 49/04* | (2006.01) | |
| *G01N 30/02* | (2006.01) | |

(52) U.S. Cl.
CPC ........ *H01J 49/167* (2013.01); *G01N 30/7233* (2013.01); *G01N 30/84* (2013.01); *H01J 49/022* (2013.01); *H01J 49/0404* (2013.01); *H01J 49/0431* (2013.01); *G01N 2030/027* (2013.01)

(58) Field of Classification Search
CPC .... H01J 49/167; H01J 49/022; H01J 49/0404; H01J 49/0431; H01J 49/045; H01J 49/0445; G01N 30/7233; G01N 30/84; G01N 2030/027; G01N 30/7266; G01N 30/466; G01N 27/44782; G01N 27/4473
USPC ......................................... 250/281, 282, 288
See application file for complete search history.

(56) References Cited

U.S. PATENT DOCUMENTS

| | | | | |
|---|---|---|---|---|
| 6,812,458 B2 * | 11/2004 | Gregori | ................ | G01N 30/466 |
| | | | | 210/198.2 |
| 6,841,774 B1 * | 1/2005 | Weiss | .................. | H01J 49/0495 |
| | | | | 250/288 |
| 2014/0291507 A1 * | 10/2014 | Brown | ................ | H01J 49/0404 |
| | | | | 250/282 |

(Continued)

FOREIGN PATENT DOCUMENTS

| | | |
|---|---|---|
| EP | 1577012 A1 | 9/2005 |
| GB | 2496312 A | 5/2013 |

OTHER PUBLICATIONS

Knierman "Developments in CE/MS Analysis of Proteins," Eli Lilly and Co., CE Pharm. Conference 2016, 36 pages (Year: 2016).*

(Continued)

*Primary Examiner* — Michael Maskell

(57) ABSTRACT

An interface device, for providing a fluidic interface between a sample separation device and a mass spectrometer, includes an emitter capillary and a plurality of sample capillaries. The sample capillaries are movably arranged within the emitter capillary for transferring fluidic sample from the sample separation device to the mass spectrometer.

18 Claims, 3 Drawing Sheets

(56) References Cited

U.S. PATENT DOCUMENTS

2015/0206729 A1    7/2015  Inagaki et al.
2016/0329198 A1*  11/2016  Badu-Tawiah ...... H01J 49/0404

OTHER PUBLICATIONS

Knierman, "Developments in CE/MS Analysis of Proteins," Eli Lilly and Co., CE Pharm Conference 2016 (36 pages).

* cited by examiner

INTERFACE DEVICE BETWEEN SAMPLE SEPARATION DEVICE AND MASS SPECTROMETER HAVING MULTIPLE SAMPLE CAPILLARIES

RELATED APPLICATIONS

This application claims the benefit under 35 U.S.C. § 119 of UK Patent Application No. GB 1901431.5, filed Feb. 1, 2019, titled "INTERFACE DEVICE BETWEEN SAMPLE SEPARATION DEVICE AND MASS SPECTROMETER HAVING MULTIPLE SAMPLE CAPILLARIES," the content of which is incorporated herein by reference in its entirety.

TECHNICAL FIELD

The present invention relates to an interface device, an analysis arrangement, and a method of transferring fluidic sample from a sample separation device to a mass spectrometer.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device.

Liquid chromatography coupled with mass spectrometry (LC/MS, HPLC-MS) is an analytical method of separating and determining components of fractions of a fluidic sample by a combination of liquid chromatography and mass spectrometry. In this context, chromatography serves for separating of molecules in a composition, and subsequent mass spectrometry is implemented for identifying and/or quantifying of the substances.

Capillary electrophoresis is an analytical separation method based on electrophoresis. The separation is carried out under the influence of an applied electric field in a thin capillary tube in an electrolyte solution.

Capillary electrophoresis coupled with mass spectrometry (CE-MS) is a coupling system of capillary electrophoresis with mass spectrometry. Typically, sample volumes may be in the order of magnitude of 10 nl, so that only a very small amount of liquid may be obtained at an outlet of a capillary electrophoresis sample separation device. A combination of capillary electrophoresis with mass spectrometry is therefore sophisticated.

Mike Knierman, "Developments in CE/MS analysis of Proteins", CE Pharm Conference 2016, available at the website location cdn.ymaws.com/www.casss.org/resource/resmgr/ce_pharm_speaker_slides/2016_ce_knierman.pdf, discloses an emitter capillary with a sheath liquid capillary and a sample capillary.

However, sample throughput is limited in an analysis arrangement combining a sample separation device with a mass spectrometer.

SUMMARY

It is an object of the present invention to enable a combination of a sample separation device with a mass spectrometer with an improved sample throughput.

According to an exemplary embodiment of the invention, an interface device for providing a fluidic interface between a sample separation device and a mass spectrometer is provided, wherein the interface device comprises an emitter capillary, and a plurality of sample capillaries being movably arranged (in particular entirely or partially) within the emitter capillary for transferring fluidic sample from the sample separation device to the mass spectrometer.

According to another exemplary embodiment of the invention, an analysis arrangement is provided which comprises a sample separation device for separating a fluidic sample, a mass spectrometer for analyzing the separated fluidic sample, and an interface device having the above-mentioned feature (in particular having at least one or all sample capillaries fluidically coupled with an outlet of the sample separation device and/or with at least one further sample separation device, and having an emitter opening of the emitter capillary fluidically coupled with the mass spectrometer) and being configured for transferring the fluidic sample from the sample separation device to the mass spectrometer.

According to still another exemplary embodiment of the invention, a method of transferring fluidic sample from a sample separation device to a mass spectrometer is provided, wherein the method comprises moving a presently activated one of a plurality of sample capillaries in an emitter capillary to an emission opening of the emitter capillary in such a way that a sample outlet opening of the activated sample capillary is aligned with (in particular is arranged at) the emission opening for transferring fluidic sample from the sample separation device to the mass spectrometer by the activated sample capillary.

In the context of the present application, the term "interface device" may particularly denote a device providing or forming a fluidic interface between, on the one hand, a sample outlet of one or more sample separation devices for separating a respective fluidic sample and, on the other hand, a mass spectrometer. Such an interface device can further process the separated fluidic (in particular liquid) sample at a connected outlet of the at least one sample separation device in such a way that it is conditioned (in particular in form of an electrospray) for further processing by the mass spectrometer.

In the context of the present application, the term "sample separation device" may particularly denote a device configured for separating a fluidic (in particular liquid) sample into fractions. For instance, such a sample separation device may be a chromatographic sample separation device or a sample separation device functioning on the basis of the principle of electrophoresis.

In the context of the present application, the term "mass spectrometer" may particularly denote a device for measuring the mass of fractions of a sample, in particular for measuring the mass of atoms or molecules. The fractions of the sample to be analyzed can be transferred into a gas phase and may be ionized. The ions can be subsequently accelerated by an electric field and supplied to an analysis unit in which the ions can be sorted for instance according to their mass-to-charge ratio. For instance, the sample may be separated into spatially separate beams by a mass spectrometer.

In the context of the present application, the term "emitter capillary" may particularly denote a capillary with a lumen or interior hollow space in which fluidic sample, which has been pre-separated in a sample separation device, can be transported towards an emission tip or opening of the emitter capillary so as to be ionized there. The interior volume or lumen of the emitter capillary may be large enough to accommodate multiple sample capillaries at the same time.

In the context of the present application, the term "sample capillary" may particularly denote a capillary accommodating or guiding a fluidic sample which has been pre-separated in a sample separation device. A fluidic outlet of such a sample separation device may be fluidically coupled with the respective inlet of one or more of the sample capillaries.

According to an exemplary embodiment of the invention, multiple sample capillaries may be arranged in a movable way in an interior of an emitter capillary. Each individual one of the sample capillaries can be coupled with the same sample separation device or with a respectively separate sample separation device. Fluidic sample which flows out of the sample separation device and into the respective sample capillary can be ejected through the sample capillary within the emitter capillary and can be ionized at an emission opening of the emitter capillary for further analysis in the mass spectrometer. By taking this measure, a respectively active (i.e. presently sample accommodating) sample capillary may be (in particular individually or selectively) moved towards the emission opening for ejecting the fluidic sample guided in the sample capillary and for supplying the latter to the emission opening. When however a sample capillary is presently not required for supplying pre-separated fluidic sample to the emission opening of the emitter capillary for injection into the mass spectrometer, this sample capillary can be retracted or moved in backward direction within an interior of the emitter capillary. A fluid (for instance a fluid with undefined composition or a fluidic sample which is presently not of interest) may nevertheless flow out of such a presently deactivated sample capillary without reaching the emission opening of the emitter capillary. By taking this measure, an interface device according to an exemplary embodiment of the invention may contribute to an increased throughput of fluidic sample. It is namely possible at each point of time to move forward a respective sample capillary for guiding separated fluidic sample to the emission tip of the emitter capillary, even when another sample capillary does presently not guide sample to be further processed (for instance since an assigned sample separation device does presently not provide pre-separated sample at an outlet). Furthermore, it is possible with an interface device according to an exemplary embodiment to operate multiple sample separation devices together with only one mass spectrometer. Mass spectrometers require in many cases a higher effort in terms of construction and involve in many cases higher costs than sample separation devices. A more efficient operation of such a mass spectrometer when operated with multiple sample separation devices is therefore highly advantageous. Furthermore, it is possible with an interface device to operate also different types of sample separation devices with one and the same mass spectrometer. For instance, a first sample capillary within the emitter capillary can be connected to and arranged downstream of a first type of sample separation device (for instance a chromatography sample separation device). A second sample capillary which is also arranged in the same emitter capillary may be assigned to another second type of sample separation device (for instance an electrophoresis sample separation device).

In the following, further exemplary embodiments of the interface device, the analysis arrangement, and the method will be explained.

In an embodiment, each of the sample capillaries is individually movable relative to the emitter capillary between an activation position of the respective sample capillary, in which a sample outlet opening of the respective sample capillary is arranged at an emission opening of the emitter capillary, and a deactivation position of the respective sample capillary, in which the sample outlet opening of the respective sample capillary is retracted with regard to the emission opening of the emitter capillary. Correspondingly, the method may comprise, after transferring the fluidic sample to the mass spectrometer, moving the presently activated sample capillary so that the sample outlet opening of this sample capillary is moved away from the emission opening. The method may also comprise, after transferring the fluidic sample to the mass spectrometer, moving a presently deactivated one of the sample capillaries for activation towards the emission opening of the emitter capillary, so that a sample outlet opening of the sample capillary to be activated is moved to the emission opening for transferring further fluidic sample from the sample separation device to the mass spectrometer by the sample capillary to be activated. It is for example possible to operate, at each time, one sample capillary in the activation position and the other one or more sample capillaries in the deactivation position. By a mere longitudinal movement of the sample capillaries in forward or backward direction in the interior of the emitter capillary, it is then possible to transfer or switch a respective sample capillary between the activation position and the deactivation position.

In an embodiment, the interface device comprises a sheath fluid supply unit for supplying sheath fluid to the emitter capillary. In the context of the present application, the term "sheath fluid" may particularly denote a fluid which can be added to or mixed with the pre-separated fluidic sample flowing out of a respective sample capillary in order to adjust a flow rate to be appropriate for further processing in the connected mass spectrometer. For instance, the sheath fluid may be a mixture of water and an organic solvent, if desired or required additionally comprising at least one additive. Such a sheath fluid can stabilize the flow through the emitter capillary and may consequently promote an uninterrupted flow.

In an embodiment, the sheath fluid supply unit is configured to provide sheath fluid of such an amount that a flow rate of the sheath fluid through the sheath fluid capillary is higher than a flow rate of fluidic sample through at least one of the sample capillaries. In particular when separating the fluidic sample in the sample separation device by capillary electrophoresis (where very small flow rates may be involved), an increase of the flow rate by adding sheath fluid may be advantageous for a stable operation of the interface device.

In an embodiment, the sheath fluid supply unit comprises a sheath fluid capillary in an interior of the emitter capillary for providing the sheath fluid to the interior of the emitter capillary. The sheath fluid can be guided in the sheath fluid capillary. The sheath fluid capillary can be arranged, partially or entirely and/or movably or statically, in the interior of the emitter capillary. For example, the sheath fluid capillary can be arranged at such a position in the interior of the emitter capillary that it is spatially retracted with regard to a sample capillary in the activation position, but is displaced in forward direction with regard to a sample capillary in the deactivation position. When taking such a measure, a sample capillary in the activation position can be supplied from its backside with sheath fluid flowing in the forward direction for adjusting an appropriate flow rate. Excessive sheath fluid may flow out of the emitter capillary being preferably open at a back side end, so that an active control or metering of sheath fluid may be dispensable. Simultaneously, the excessive sheath fluid draining in backward direction can take along with it a fluid (for instance a fluid with undefined composition) flowing out of a sample capillary which is presently in the deactivation position, and can therefore contribute to the draining of such a fluid also in a backward direction. This fluid removal to waste may be accomplished without disturbing or deteriorating purity of a fluidic sample to be further processed and flowing out of a sample capillary which is presently in the activation position. By the adjustment of the flow rate of the sheath fluid, an appropriate total flow rate of the fluid at the emission opening can be ensured. As a result, a stable and uninterrupted flow can be guaranteed at the outlet of the interface device. This is highly advantageous for the creation of an electrospray.

In an embodiment, an outer wall of the sheath fluid capillary has a higher electric conductivity than an outer wall of the sample capillaries. This may have a positive impact on the properties of the created electrospray.

In another embodiment, the sheath fluid supply unit comprises a sheath fluid supply conduit leading into the emitter capillary (in particular leading into a lateral area, for instance into a cylindrical surface, of the emitter capillary) for supplying a sheath fluid to an interior of the emitter capillary. This may allow for a highly compact manufacture of the emitter capillary, since only the sample capillaries need to be accommodated in its interior in such an embodiment.

In an embodiment, the interface device comprises a high voltage source for providing a high electric voltage to be applied to the sample capillaries. By such a high voltage, the ionization of the fluidic sample flowing out of a respective sample capillary may be promoted. By applying a high voltage (for instance in a range between 2 kV and 3 kV) to a strongly tapering emission opening of the emitter capillary, an ionization of an already separated fluidic sample may be promoted and a proper electrospray may be created. Such an electrospray is highly advantageous for an analysis in the mass spectrometer. A flow rate of the electrospray which can be ejected at the emission tip of the emitter capillary can be for example in a range between 100 nl/min and 500 nl/min, for instance 300 nl/min.

In an embodiment, a common high voltage source is provided for all sample capillaries in common. The provision of only one common high voltage source for all sample capillaries enables a highly compact construction of the interface device. A single high voltage source may be sufficient, since preferably at each time exactly one of the sample capillaries is in the activation position. A high voltage at the one or more sample capillaries being presently in the deactivation position is not necessary.

In an embodiment, each of the sample capillaries is coupled with a respective high voltage switch which is configured for selectively coupling the respective sample capillary with or for selectively decoupling the respective sample capillary from the high voltage source. By the provision of a high voltage switch, a single high voltage source can be conveniently coupled with a respective sample capillary being presently in the activation position and can be decoupled from one or more further sample capillaries being presently in the deactivation position.

In an embodiment, the sample capillaries are arranged parallel to one another in the interior of the emitter capillary. When a sheath fluid capillary is present, the sheath fluid capillary may also be arranged parallel to the sample capillaries. The parallel arrangement of the sample capillaries and preferably of a sheath fluid capillary in the interior of the emitter capillary promotes a space-saving and compact configuration and additionally allows for a simple forward or backward movement of a respective one of the sample capillaries in the interior of the emitter capillary.

In an embodiment, the emitter capillary and the sample capillaries are configured so that, upon moving a sample outlet opening of a respective sample capillary to an emission opening of the emitter capillary, fluidic sample flows out of the sample capillary and is ionized. This can be achieved by a pronounced tapering tip of the emitter capillary at the outlet opening, by a pronounced tapering tip of the respective sample capillary at its respective outlet opening, and/or by the application of a high voltage. The ionized fluidic sample being preferably mixed with sheath fluid is then be obtained the form of an electrospray which is suitably conditioned for further processing in the mass spectrometer.

In an embodiment, one end of the emitter capillary comprises an emission opening for emitting a fluidic sample comprising electrospray. A back end (for instance an opposing other end) of the emitter capillary may have a drain opening (in particular being larger than the emission opening) for draining excessive sheath fluid and/or fluid flowing out of at least one presently deactivated of the sample capillaries. By triggering a draining of fluid of the emitter capillary via the back side, an exact metering of sheath fluid may be dispensable. Further advantageously, this makes a pressureless operation of the interface device possible. This, in turn, reduces the effort for manufacturing and operating the interface device. As a further advantage, it may also be dispensable according to this embodiment to disable a flow of (for instance undefined) fluid out of a presently deactivated sample capillary, while a presently activated sample capillary ejects fluid to the emission opening. Since the presently deactivated sample capillary is displaced in a backward direction with regard to the presently activated sample capillary, an excessive sheath fluid draining via a backside of the emitter capillary may take along with it fluid flowing out of a presently deactivated sample capillary. As a result, such undefined fluid will not disturb the fluidic sample to be further processed and presently flowing out of a presently activated sample capillary.

In an embodiment, the sample capillaries are configured to be movable in a coordinated way so that, when a respective one of the sample capillaries has its sample outlet opening at an emission opening of the emitter capillary, a sample outlet opening of another of the sample capillaries is retracted with respect to the emission opening. By such a coordinated operation, the throughput of fluidic sample which is to be further characterized in a mass spectrometer may be further increased.

In an embodiment, the interface device is configured for providing a fluidic interface between a capillary electrophoresis sample separation device and the mass spectrometer. An outlet of the capillary electrophoresis sample separation device may then be fluidically coupled with an inlet of one or more respective sample capillaries. In particular, flow rates being typical for capillary electrophoresis (for instance 100 nl/min to 500 nl/min) are properly suitable for the processing in the interface device, in particular in combination with a sheath fluid.

In an embodiment, the interface device is configured for providing a fluidic interface between a chromatography sample separation device and the mass spectrometer. An outlet of the chromatography sample separation device may then be fluidically coupled with an inlet of one or more respective sample capillaries. Although the flow rates of a separated fluidic sample at an outlet of a chromatography sample separation device may be in the order of magnitude of ml/min, it has turned out that an interface device according to an exemplary embodiment of the invention also allows for the processing of a pre-separated chromatographic sample of such a high flow rate, if desired in combination with a sheath fluid.

In an embodiment, the interface device comprises a drive unit for individually moving a respective one of the sample capillaries, in particular for moving the sample capillaries in an anticyclical way (i.e. moving one sample capillary in a forward direction and simultaneously moving another sample capillary in the backward direction). In particular, the drive unit may be configured as linear actuator. Such a drive unit, preferably configured as linear actuator, can be configured as a step motor in order to allow for a particular precise motion in forward and backward direction.

In an embodiment, the interface device may comprise a fastening unit, in particular a clamping unit, which is configured for fastening (in particular clamping) the sample capillaries, and optionally also a sheath fluid capillary. Simply clamping a respective sample capillary or sheath fluid capillary at a fastening unit enables a user to carry out an assembly or a replacement of a sample capillary or a sheath fluid capillary within the emitter capillary in a simple way and without the danger of damage. Moreover, by the lateral fastening of the sample capillaries and optionally a sheath fluid capillary at the fastening unit, a target position of the respective capillary can be precisely adjusted. This may promote a simple movability of the respective capillaries without undesired interaction between different capillaries in the emitter capillary.

In an embodiment, an inner diameter of the emitter capillary is smaller than 2 mm, in particular smaller than 1.5 mm. Additionally or alternatively, an outer diameter of the sample capillaries may be smaller than 600 µm, in particular smaller than 400 µm. If present, an outer diameter of a sheath flow capillary may be smaller than 600 µm, in particular smaller than 400 µm, as well. By the mentioned dimensions of emitter capillary and sample capillaries (and in a corresponding way of an optional sheath fluid capillary) it is possible in a highly compact way to accommodate multiple sample capillaries in the emitter capillary without an undesired interaction between them.

In an embodiment, the interface device may be configured as electrospray interface device. In other words, the interface device may be configured to provide a pre-separated fluidic sample flowing out of a tip of a sample capillary in an activation position toward the emission opening of the emitter capillary, and to transfer such a fluidic sample in the form of an electrospray to be further processed by mass spectrometry.

In an embodiment, an emission opening of the emitter capillary may have a tapering end. Additionally or alternatively, at least one of the sample capillaries may have a tapering end for an outflow of fluidic sample. In an embodiment, a sheath fluid capillary may have a cylindrical (i.e. non-tapering) end for an outflow of sheath fluid. Advantageously, the ends of the sample capillaries and the end of the emitter capillary may be strongly tapering with a small end diameter. The sample capillaries and the emitter capillary can for instance be capillaries made of silica, and may be optionally provided with a bending promoting and/or friction reducing coating (for instance a coating of polyimide) to thereby also increase the mechanical robustness of the respective capillary.

For instance, a sample capillary can have an inner diameter of 30 µm, more generally between 10 µm and 100 µm. An outer diameter of a respective sample capillary at an open end can for instance be in a range between 40 µm and 80 µm, in particular between 50 µm and 70 µm.

Particularly advantageous is a pronounced tapering end of the emitter capillary, since a strongly tapering end may result in a locally high electric field strength, which may enable the creation of an electrospray already at a moderate supply of sheath fluid. As sheath fluid, it is for instance possible to use a mixture of water and ethanol, optionally comprising acetic acid. The sheath fluid may serve, descriptively speaking, for a stable flow at the emission opening of the emitter capillary and may disable an undesired interruption of the fluid flow. However, the sheath fluid also dilutes the fluidic sample to be analysed and should therefore be added in a moderate amount. In order to achieve this, it is possible to dimension the tip of the emitter capillary to have an outer diameter in the range between 30 µm and 50 µm, for instance 40 µm. The emitter capillary may denote the capillary at which an electrospray is emitted which is then injected into the mass spectrometer.

In an embodiment, the interface device is configured for a coordinated operation of the sample capillaries, in particular for an alternating or simultaneous operation of the sample capillaries for transferring fluidic sample to the mass spectrometer. In this way the amount of fluidic sample to be further processed by the mass spectrometer can be increased and a high throughput may be obtained. This allows for a particular efficient operation of the mass spectrometer.

In an embodiment, the analysis arrangement comprises a further sample separation device for separating a fluidic sample, wherein the sample separation device is connected to one of the sample capillaries and the further sample separation device is connected to another one of the sample capillaries. For example, the (first) sample separation device may be connected to a first sample capillary of the plurality of sample capillaries, and the further (or second) sample separation device may be connected to a further (or second) sample capillary of the plurality of sample capillaries.

In an embodiment, the sample separation device and the further sample separation device are both electrophoresis sample separation devices (in particular capillary electrophoresis sample separation devices). Alternatively, the sample separation device and the further sample separation device are both chromatography sample separation devices (in particular liquid chromatography sample separation devices, further particularly nano liquid chromatography sample separation devices). In still another embodiment, the sample separation device is an electrophoresis sample separation device (in particular a capillary electrophoresis sample separation device) and the further sample separation device is a chromatography sample separation device (in particular a liquid chromatography sample separation device, more particularly a nano liquid chromatography sample separation device). In capillary electrophoresis technology, a flow rate of the fluidic sample at the outflow side may be typically in the range between 100 nl/min and 500 nl/min, for example 200 nl/min. A flow rate of sheath fluid is typically in the range between 1 µl/min and 5 µl/min. In liquid chromatography, the flow rates may be even significantly higher. It has turned out that despite of such different flow rates also a combination of liquid chromatography corresponding to one of the sample capillaries and capillary electrophoresis according to another one of the sample capillaries is possible.

In this context, it may also be advantageous that a backside end of the emitter capillary, i.e. an end of the emitter capillary opposing its emission opening, can be open and may allow for a simple pressureless draining of excessive fluid out of the emitter capillary. In particular, it may be possible in this way to move a presently non-used sample capillary within the emitter capillary in the backside direction with respect to the emission opening. Fluidic sample or fluid with an undefined composition flowing out of a presently deactivated sample capillary can then flow out of the emitter capillary without reaching the emission opening of the emitter capillary. By the selective forward and backward motion of the sample capillaries it can thus be ensured that only desired fluidic sample flowing out of an end of a presently activated and thus frontside-located sample capillary actually flows towards the emission opening of the emitter capillary.

With an interface device according to an exemplary embodiment of the invention it may be possible to carry out multiple sample separation procedures (for instance in parallel) and to transfer the separated samples for further analysis subsequently into a mass spectrometer. For this purpose, a sample to be analyzed can be ejected out of a sample capillary which has been moved forward towards an emission opening of the emitter capillary. Another sample capillary which has been moved within the emitter capillary to an inactive retracted position can be operated without flow interruption, even when its separated fluidic sample or mobile phase is not to be analyzed at present in the mass spectrometer. Such fluid flowing out of a presently inactive sample capillary can for instance flow out of the emitter capillary via a large backside opening thereof. Also excessive sheath fluid can drain in this manner via the backside opening of the emitter capillary, which renders a precise metering of sheath fluid dispensable.

Embodiments of the above described analysis arrangement may be operated with a sample separation device which may be implemented in conventionally available high-performance liquid chromatography (HPLC) systems, such as the Agilent 1200 Series Rapid Resolution LC system or the Agilent 1150 HPLC series (both provided by the applicant Agilent Technologies—see the website www.agilent.com—which shall be incorporated herein by reference).

One embodiment of a sample separation device comprises a pumping apparatus as fluid drive unit having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties.

A separation unit of the sample separation device preferably comprises a chromatographic column (see for instance the website location en.wikipedia.org/wiki/Column_chromatography) providing a stationary phase. The column may be a glass or steel tube (for instance with a diameter from 50 µm to 5 mm and a length of 1 cm to 1 m) or a microfluidic column (as disclosed for instance in European Patent Application EP 1577012 A1, which is incorporated by reference herein in its entirety, or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

A mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive unit, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilent.com, which shall be incorporated herein by reference.

Embodiments of the invention can be partly or entirely embodied or supported by one or more suitable software programs, which can be stored on or otherwise provided by any kind of data carrier (e.g., a machine-readable, non-transitory medium), and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
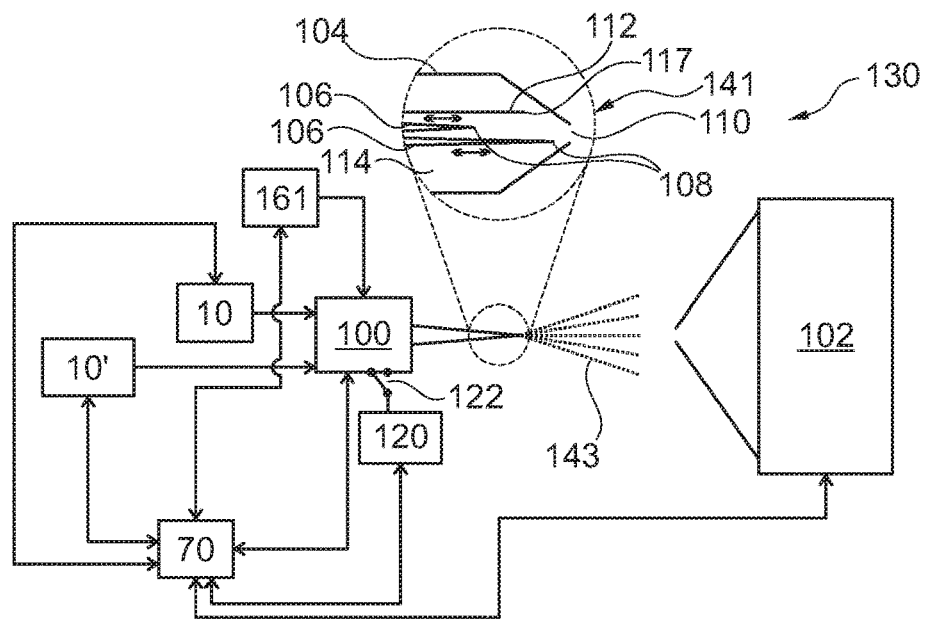
FIG. 1 illustrates an analysis arrangement according to an exemplary embodiment of the invention.

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, an interface device is provided which forms an electrospray-mass spectrometer (ESI-MS) interface. In this context, an ESI (electrospray) relates to a way to ionize a fluidic sample and to then introduce the sample ions into a mass spectrometer (MS) for detection. For the ionization, a high voltage (for example in the range from 1.5 kV to 5 kV) may be applied between a spraying nozzle suppling the sample and an orifice entry of the MS. Due to the electrical field between nozzle and orifice, the liquid may form a Taylor cone where at the tip of the Taylor cone charged droplets may be emitted and accelerated towards the MS orifice. Due to evaporation of solvent in the droplet, the charges inside the droplet may get more dense or densified. When the charge density in the droplet reaches the Rayleigh limit the droplet explodes into single charged analyte ions and can be detected inside the MS.

The above mentioned ESI-MS interface describes a typical LC-ESI-MS interface, i.e. an electrospray creating interface between a liquid chromatography (LC) sample separation device and a mass spectrometer.

If capillary electrophoresis (CE) shall be used as a separation technique for separating the fluidic sample, the ESI interface to the MS may be more complex, since CE may involve an electric grounding of the CE capillary at the end. Also the flow rates in CE (for instance in a range between 50 nl/min and 250 nl/min) can be much lower than a flow rate which is appropriate for an ESI. In order to bridge this barrier of flow rates, an additional sheath fluid (in particular sheath liquid) may be supplied to make the ground contact to the CE capillary and also to adapt flow rate and ESI spray conditions (in particular in terms of pH value and organic properties).

Next, a nano CE-ESI interface will be described. As mentioned before, typical flowrates in CE are in a range between 50 nl/min and 250 nl/min due to a usually small inner diameter of the CE capillary (for instance in a range between 25 μm and 50 μm). Thus, a sheath flow may be advantageous to adapt the flow rate to a typical flowrate for ESI (for instance in a range between 4 μl/min and 10 μl/min). An advantage of such a sheath fluid (in particular sheath liquid) is that pH value and organic content of the sample can be adjusted or even optimized for obtaining an appropriate electrospray. Flow rates for a stable electrospray can be reduced by tapering the spraying nozzle of the electrospray, in particular down to a diameter in a range between 30 μm and 80 μm. For example, an ESI flowrate for a 50 μm nozzle may be about 300 nl/min.

According to an exemplary embodiment of the invention, an interface device may be provided which may constitute a fluidic interface between one or more sample separation devices on the one hand and a single mass spectrometer on the other hand, wherein the transfer of fluidic sample may be accomplished by multiple (i.e., a plurality of) sample capillaries within a single emitter capillary of the interface device. In particular, such an interface device may be configured as a multi sample capillary nano CE-ESI-MS interface.

Advantageously, an exemplary embodiment may combine an approach to move sample capillaries inside an emitter capillary (in particular to remove unwanted background or salt inside the mass spectrometer) together with a further approach of implementing serial injections inside one emitter capillary to more efficiently use the mass spectrometer instrument and obtain a higher throughput. This may be achieved by arranging multiple sample capillaries within a single emitter capillary to run multiple separations in parallel.

The following example relates to an embodiment with two capillary electrophoresis sample capillaries running in parallel and at least partially within a common emitter capillary. On both capillary electrophoresis sample capillaries, a separation may be running, and a high voltage may be applied. Grounding of the two sample capillaries may be made via a sheath liquid capillary which may preferably have a significantly higher conductivity compared to the sample capillaries, so that the voltage drop over the sheath liquid is negligible. The sheath flow rate may also be significantly higher compared to the flow rates of fluidic sample through the sample capillaries separated by capillary electrophoresis, so that fluidic sample eluated from a second one of the sample capillaries may be flushed out of the emitter capillary. A first one of the sample capillaries may be moved towards the emitter capillary tip so that due to the electrospray flow, fluidic sample may be pulled out of the tip and may be ionized. Thus, the first sample capillary and the second sample capillary may run the capillary electrophoresis sample separation in a time shifted way, so that the second sample capillary can be moved to the emitter tip of the emitter capillary when the sample reaches the capillary end.

Such an embodiment involving multiple (for instance capillary electrophoresis) separations in parallel on one interface device (such as an ESI-MS interface) increases the efficiency and throughput of fluidic sample. A respective sample capillary of interest (i.e. a sample capillary being presently activated) may be moved (for instance by a linear actuator) to the emitter tip or emission opening of an emitter capillary accommodating all sample capillaries. All other sample capillaries may be in the "OFF" position or in a deactivation state.

Advantageously, only one high voltage power supply (for instance providing a high voltage of +/−30 kV) may be sufficient to run all sample separation capillaries in parallel. Each sample separation capillary may have its own high voltage switch, so that the high voltage can be switched off during injection or sample capillary preparation.

As a further advantage, sample capillary exchange may be simple for a user, and no pre-alignment is needed. All other sample capillaries may be moved to a switch-off position or into a deactivated state. It may be sufficient that the user inserts a respective sample capillary until a mechanical stop is reached, and then to clamp it to a linear actuator or other appropriate drive unit. The linear actuator (or other appropriate drive unit) may move the selected sample capillary back to a target position (i.e. ON or OFF or, in other words, activated or deactivated).

Thus, a high performance analysis arrangement can be realized by an exemplary embodiment of the invention, in particular when a multisampler supports two injection ports and therefore two parallel running capillary electrophoresis separations.

FIG. 1 illustrates an analysis arrangement 130 according to an exemplary embodiment of the invention.

The illustrated analysis arrangement 130 comprises two sample separation devices 10, 10', each being configured for separating a respective fluidic sample into its respective fractions. For example, the analysis arrangement 130 may include a (first) sample separation device 10 and a further (or second) sample separation device 10'. The (first) sample separation device 10 may be connected to a first sample capillary of the plurality of sample capillaries, and the further (or second) sample separation device 10' may be connected to a further (or second) sample capillary of the plurality of sample capillaries. For instance, the two sample separation devices 10, 10' are two capillary electrophoresis sample separation devices, two liquid chromatography sample separation devices, or one capillary electrophoresis sample separation device and one liquid chromatography sample separation device.

Furthermore, the analysis arrangement 130 comprises a single common shared mass spectrometer 102 for analyzing the fluidic samples separated by the sample separation devices 10, 10' in accordance with mass spectrometry.

An interface device 100 of the analysis arrangement 130 serves for transferring the fluidic samples from the respective sample separation device 10 or 10' to the mass spectrometer 102. In other words, the interface device 100 functions as fluidic interface between a respective outlet of a respective one of the sample separation devices 10, 10' providing a separated liquid sample and the mass spectrometer 102 requiring an electrospray 143 for the further analysis. As illustrated in a detail 141 in FIG. 1, the interface device 100 comprises an emitter capillary 104 and two sample capillaries 106 being movably arranged partially or entirely within the emitter capillary 104. An inlet of one of the sample capillaries 106 may be fluidically coupled with an outlet of the sample separation device 10 and is supplied with fluidic sample which has previously been separated by sample separation device 10. An inlet of the other of the sample capillaries 106 is fluidically coupled with an outlet of the other sample separation device 10' and is supplied from the other sample separation device 10' with separated fluidic sample.

Alternatively, both sample capillaries 106 may be coupled with one in the same sample separation device 10.

Again referring to FIG. 1, each of the sample capillaries 106 serves for transferring of respective fluidic sample of a respectively coupled one of the sample separation devices 10, 10' to the mass spectrometer 102. At an emission tip 110 of the emitter capillary 104, an ionic electrospray 143 is created based on the respectively separated fluidic sample in a fashion which is known as such by a person skilled in the art of generating an electrospray. The electrospray 143 is further processed in the mass spectrometer 102 in a fashion which is known as such by a person skilled in the art of mass spectrometry. The creation of a stable electrospray 143 is promoted by a sheath fluid capillary 112 which is located also at least partially within the emitter capillary 104. The sheath fluid capillary 112 may add a sheath fluid (in particular a sheath liquid) to an interior 114 of the emitter capillary 100 at an outlet tip 117 of the sheath fluid capillary 112. More generally, the interface device 100 comprises sheath fluid supply unit 161 including the sheath fluid capillary 112 and being configured for supplying sheath fluid to the emitter capillary 104 by the sheath fluid capillary 112. The sheath fluid may be mixed with the respective fluidic sample, ensures a sufficiently high flow, and contributes to an uninterrupted flow at the emission tip 110.

By a high voltage source 120, a high voltage of for example 3 kV may be applied to the sample capillaries 106. Preferably, a single shared high voltage source 120 may be provided for all sample capillaries 106 in common. For instance, each of the sample capillaries 106 can be coupled with a respective individual or with one common high-frequency switch 122 which may be configured for selectively coupling a respective sample capillary 106 with the high voltage source 120 or for selectively decoupling the respective sample capillary 106 from the high voltage source 120.

The interface device 100 may be operated in accordance with a coordinated operation of the multiple sample capillaries 106. More specifically, the interface device 100 serves for an alternating or simultaneous operation of the multiple sample capillaries 106 for transferring fluidic sample to the mass spectrometer 102.

Exemplary embodiments of the invention have the specific advantage that, due to the described configuration of the interface device 100, the flow of electrospray 143 does not have to be interrupted, even when fluidic sample from multiple different sample separation devices 10, 10' is coupled via the multiple sample capillaries 106 into the interior 114 of the emitter capillary 104.

FIG. 1 illustrates how pre-separated fluidic sample flowing out of the two different sample separation devices 10, 10' can be supplied to the interface device 100. At the interface device 100, a high voltage is applied to a respectively activated sample capillary 106 by control unit 70 which also controls the high voltage source 120 and the switch 122. As shown in FIG. 1, control unit 70 also controls the other components of the analysis arrangement 130. The high voltage can be supplied by the high voltage source 120 in a corresponding switch position of switch 122. Each of the sample capillaries 106 can be longitudinally moved along a horizontal direction of FIG. 1 in the interior 114 of the emitter capillary 104 forwardly or backwardly. One of the sample capillaries 106 which has been moved to the front side into an activation position (according to FIG. 1 the lower of the two sample capillaries 106) can eject the sample at its sample outlet tip 108 into the lumen or interior 114 of the emitter capillary 104, more precisely directly adjacent to the emission opening or emission tip 110.

By the sheath fluid capillary 112 having an outlet tip 117 being located longitudinally in between the outlet tips 108 of the sample capillary 106 in the activation position on the one hand and the other sample capillary 106 in a deactivation position on the other hand, a sheath fluid (for instance a mixture of water and an organic solvent) may be provided and may be mixed with the fluidic sample flowing out of the activated sample capillary 106. A flow rate of the mixture of fluidic sample and sheath fluid at the emission opening or emission tip 110 can be appropriately set in order to enable a stable and continuous flow towards the mass spectrometer 102. Excessive sheath fluid can flow out of the emitter capillary 104, which is open on the rear side, through its rear side at a drain opening 163 (compare FIG. 2 and FIG. 3). Optionally, a fluid (for instance having an undefined composition) flowing out of the sample capillary 106 being presently in the deactivation position can flow together with the previously mentioned excessive sheath fluid throughout the open rear side of the emitter capillary 104. Advantageously, any undesired interaction of excessive sheath fluid or undefined fluid with the fluidic sample which is to be further analyzed and is therefore converted into electrospray 143 may thus be prevented in a simple way. Due to the drain opening 163 of emitter capillary 104, the interface device 100 may be operated in a pressureless fashion and without the need to precisely meter an amount of sheath fluid.

As shown by double arrows in detail 141, each of the sample capillaries 106 may be individually driven forwardly towards emission tip 110 or backwardly away from the emission tip 141. In the shown embodiment, the sheath fluid capillary 112 remains stationary at a fixed position in the interior 114 of the emitter capillary 104.

The created electrospray 143 can be further processed or analyzed in the mass spectrometer 102.

Figure 2:
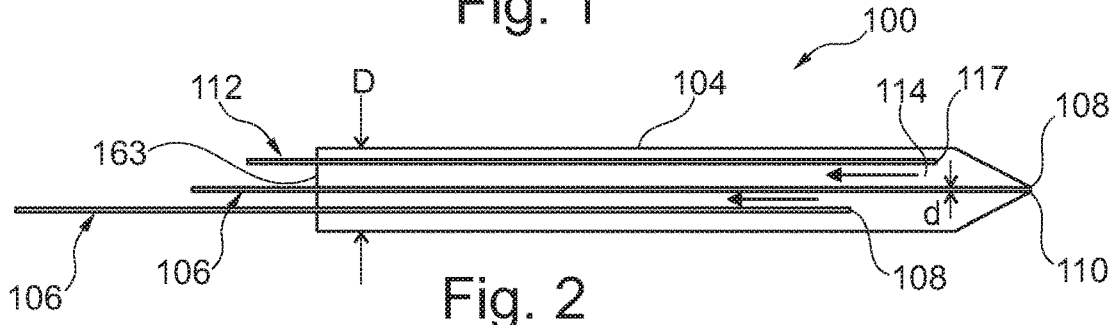
FIG. 2 illustrates a cross-section of an interface device according to an exemplary embodiment of the invention in a first operation mode.
Figure 3:
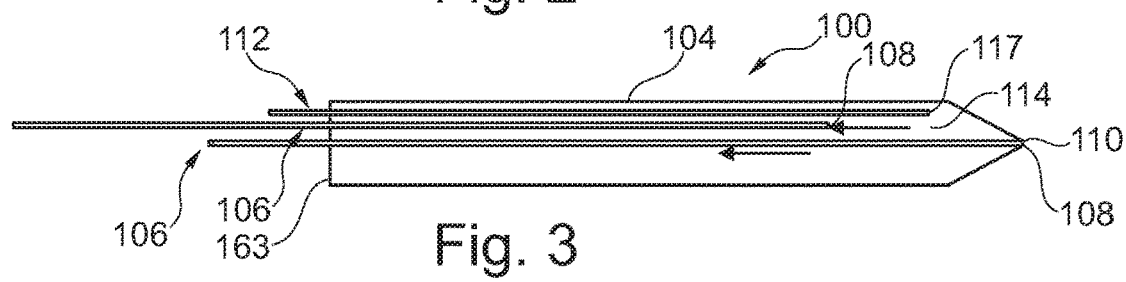
FIG. 3 illustrates the interface device according to FIG. 2 in a second operation mode.

FIG. 2 illustrates an interface device 100 according to an exemplary embodiment of the invention in a first operation mode. FIG. 3 illustrates the interface device 100 according to FIG. 2 in a second operation mode.

Each of the sample capillaries 106 is configured so as to be movable in a longitudinal direction between an activation position and a deactivation position. In the activation position (compare the upper sample capillary 106 according to FIG. 2), a sample outlet opening or outlet tip 108 of the respective activated sample capillary 106 is located directly at the emission opening or emission tip 110 of the emitter capillary 104. In the deactivation position (compare the lower sample capillary 106 according to FIG. 2), the sample outlet opening or outlet tip 108 of the respective sample capillary 106 is retracted towards the rear end relating to drain opening 163 of the emitter capillary 104, when compared with the activation position.

An outer wall of the sheath fluid capillary 112 has preferably a higher electric conductivity than an exterior wall of the sample capillaries 106. The sample capillaries 106 and the sheath fluid capillary 112 can be advantageously configured so that the flow rate of sheath fluid through the sheath fluid capillary 112 is higher than a flow rate of fluidic sample through a respective one of the sample capillaries 106 when configured for contributing to capillary electrophoresis separation. As illustrated in FIG. 2 and FIG. 3, the sample capillaries 106 and the sheath fluid capillary 112 can be aligned or oriented in an interior 114 of the emitter capillary 104 to extend in parallel to one another.

The emitter capillary 104 and the sample capillaries 106 as well as the sheath fluid capillary 112 can interact so that, upon moving a sample outlet opening 108 of the respective sample capillary 106 to the emission opening 110 of the emitter capillary 104, fluidic sample flows out of the sample capillary 106 and sheath fluid flows out of the sheath fluid capillary 112, the fluids combine or mix, and ionize to thereby form electrospray 143.

In this context, the sample capillaries 106 and the sheath fluid capillary 112 can be moved in a coordinated manner controlled by control unit 70 (shown in FIG. 1) so that, when a respective one of the sample capillaries 106 has its sample outlet opening 108 at the emission opening 110 of the emitter capillary 104, a sample outlet opening 108 of another of the sample capillaries 106 is simultaneously retracted with respect to the emission opening 110. The outlet tip 117 of the sheath fluid capillary 112 is thereby retracted in a backward direction with respect to an outlet tip 108 of a respectively activated sample capillary 106 and is displaced in a forward direction with respect to an outlet tip 108 of a respectively deactivated sample capillary 106.

For instance, an inner diameter, D, of the emitter capillary 104 may be smaller than 1.5 mm. An outer diameter, d, of each of the sample capillaries 106 and of the sheath fluid capillary 112 can be smaller than 400 µm.

During operation, the interface device 100 serves for transferring fluidic sample from one or multiple sample separation devices 10, 10' to mass spectrometer 102. In this context, a presently activated one of multiple sample capillaries 106 is moved within the emitter capillary 104 towards the emission opening 110 of the emitter capillary 104 so that the sample outlet opening 108 of the activated sample capillary 106 is located at or close to the emission opening 110. By the activated sample capillary 106, fluidic sample can be transferred from the sample separation device 10 or 10' into the mass spectrometer 102, while the accompanying sheath fluid capillary 112 can add a flow stabilizing sheath fluid to the fluidic sample which is to be converted into an electrospray 143.

After transferring the (e.g., first) fluidic sample by a presently activated sample capillary 106 (e.g., a first sample capillary 106), this sample capillary 106 may be moved in such a way that its sample outlet opening 108 is moved away from the emission opening 110. Furthermore, after transferring of fluidic sample into mass spectrometer 102, a motion of a previously or presently deactivated sample capillary 108 (e.g., a further, or second, sample capillary 106), which is now to be activated, can be carried out towards the emission opening 110 of the emitter capillary 104 in such a way, that the sample outlet opening 108 of this sample capillary 106 to be activated is located at or close to the emission opening 110. Subsequently, the previously deactivated and now activated sample capillary 106 may be used for transferring further (e.g., second) fluidic sample from its assigned and connected sample separation device 10 or 10' into the mass spectrometer 102. By the now activated sample capillary 106, this further fluidic sample may be supplied from the sample separation device 10 or 10' into mass spectrometer 102. Simultaneously, the accompanying sheath fluid capillary 112 may add further flow stabilizing sheath fluid to the further fluidic sample to be transferred into electrospray 143.

FIG. 2 and FIG. 3 show that by a mere longitudinal individual coordinated displacement of the sample capillaries 106 with respect to the emitter capillary 104, the individual sample capillaries 106 may be converted or transformed between an activation position and a deactivation position. By taking this measure, the interface device 100 can almost continuously process fluidic sample (i.e. without any substantial dead time) and may properly condition the fluidic sample for further processing in mass spectrometer 102.

According to FIG. 2 and FIG. 3, the outlet tips 108, 110 of the emitter capillary 104 and the sample capillaries 106 are conically tapering and very thin. At the emitter capillary 104 this results in a particularly high electric field strength at the emission opening 110 and thus contributes to an efficient creation of electrospray 143. Moreover, the sharp or peaked openings of the sample capillaries 106 also contribute to this efficient creation of electrospray 143. The sheath fluid capillary 112, however, can have a cylindrical shape, i.e. may be provided without a tapering tip on the front side.

Figure 4:
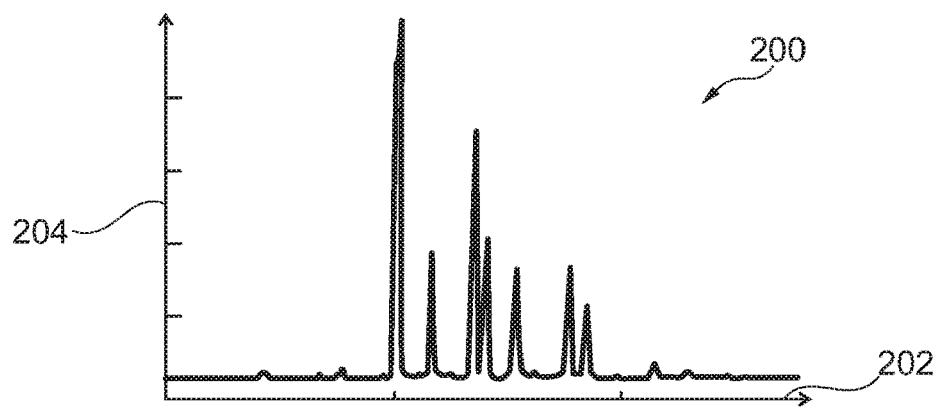
FIG. 4 shows an electropherogram which can be obtained by a capillary electrophoresis analysis with subsequent mass spectrometry using an interface device according to FIG. 2 and FIG. 3.
Figure 5:
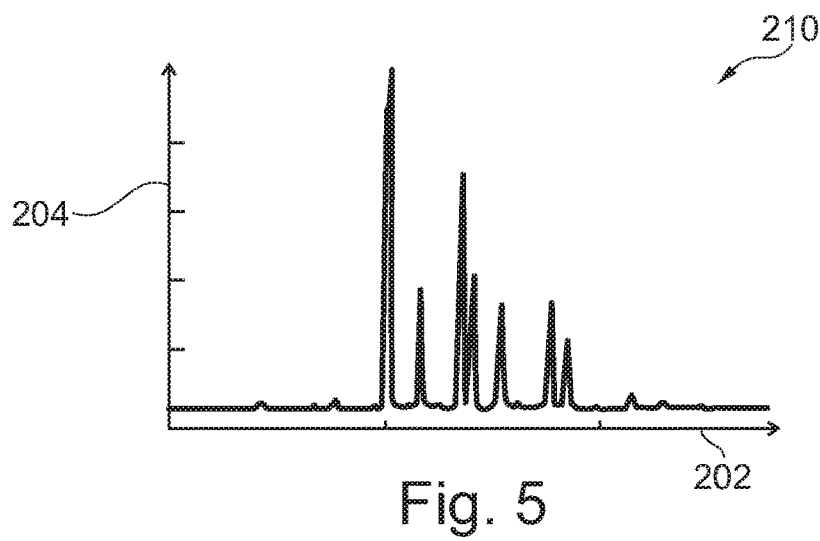
FIG. 5 shows another electropherogram which can be obtained by a capillary electrophoresis analysis with subsequent mass spectrometry using an interface device according to FIG. 2 and FIG. 3.
Figure 6:
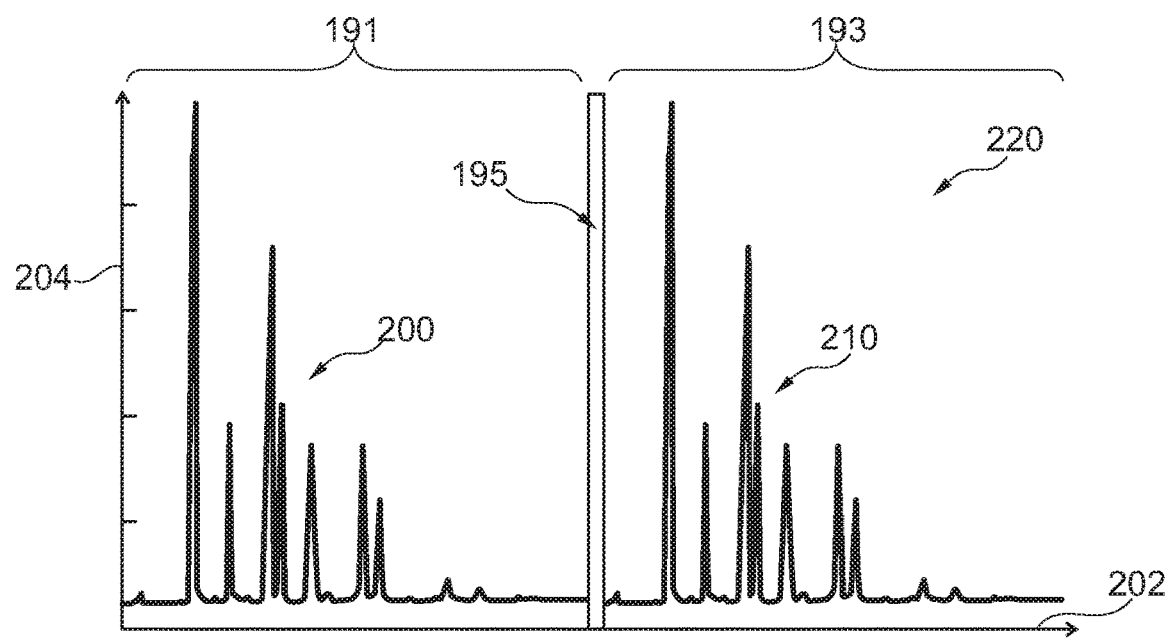
FIG. 6 shows another electropherogram which can be obtained by a capillary electrophoresis analysis with subsequent mass spectrometry using an interface device according to FIG. 2 and FIG. 3.

FIG. 4 to FIG. 6 show electropherograms 200, 210, 220 which can be obtained by a capillary electrophoresis analysis with subsequent mass spectrometry using an interface device 100 according to FIG. 2 and FIG. 3. Along an abscissa 202 of the electropherograms 200, 210, 220, the time is plotted, whereas along an ordinate 204, a signal is plotted.

FIG. 4 and FIG. 5 illustrate electropherograms 200, 210 which can be obtained when connecting a sample separation device 10 to an interface device 100 via only one of the sample capillaries 106. FIG. 6 shows that, by temporarily alternating activation and deactivation states of the sample capillaries 106, the sample separation device 10 can be operated using a single interface device 100, in order to firstly transfer fluidic sample from one of the sample capillaries 106 and to subsequently transfer further fluidic sample from the other sample capillary 106 towards the connected mass spectrometer 102 for further processing. A corresponding range 191 hereby corresponds to an operation state in which fluidic sample flowing out of the sample separation device 10 is transferred into the mass spectrometer 102 via one of the sample capillaries 106 of the interface device 100. A range 193 corresponds to another later time interval during which fluidic sample flows out of the sample separation device 10 via the other sample capillary 106. Reference numeral 195 illustrates a time interval corresponding to a sample capillary change or a sample capillary switching state.

Figure 7:
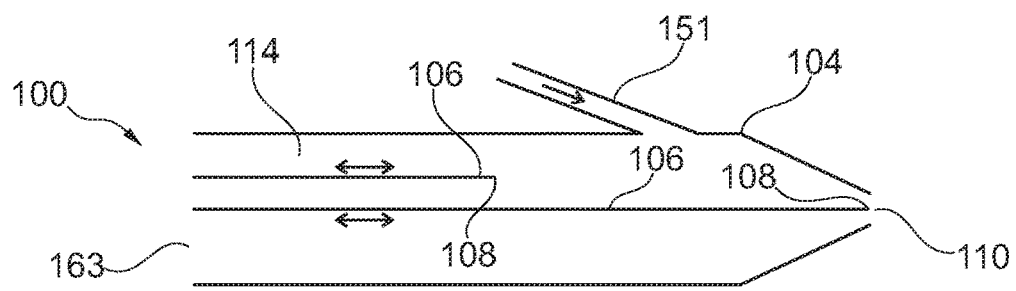
FIG. 7 shows an interface device according to another exemplary embodiment of the invention with a lateral sheath fluid supply line for supplying sheath fluid to an emitter capillary.

FIG. 7 shows an interface device 100 according to another exemplary embodiment of the invention with a lateral supply line 151 for supplying sheath fluid to an emitter capillary 104. As shown in FIG. 7 and as an alternative to the previously described embodiments of FIG. 1 to FIG. 3, the provision of a separate sheath fluid capillary 112 in the emitter capillary 104 may be dispensable. In contrast to this, FIG. 7 provides a lateral supply line 151 which leads laterally into the emitter capillary 104 and supplies sheath fluid to an interior 114 of the emitter capillary 104.

Figure 8:
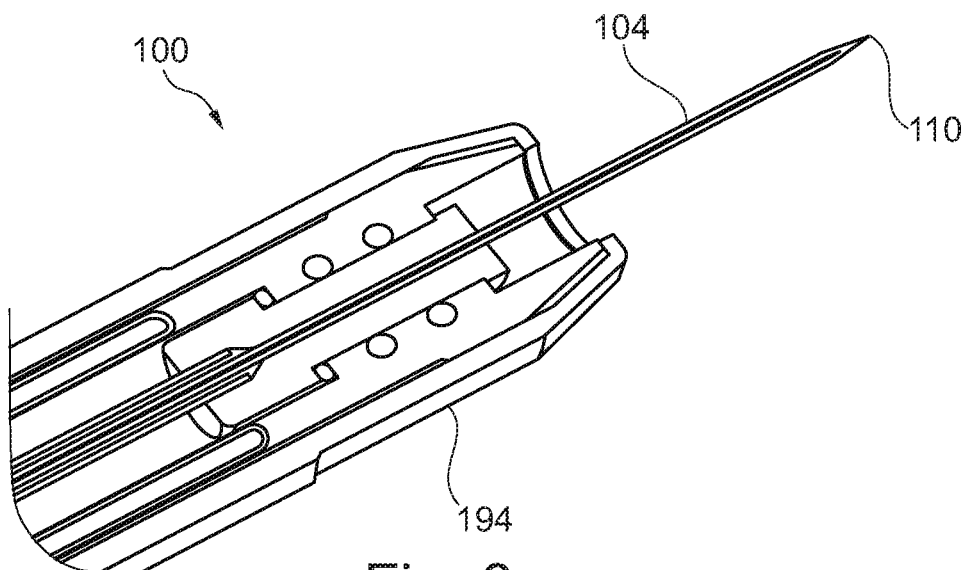
FIG. 8 shows a three-dimensional cross-sectional view of a part of an interface device according to an exemplary embodiment of the invention.
Figure 9:
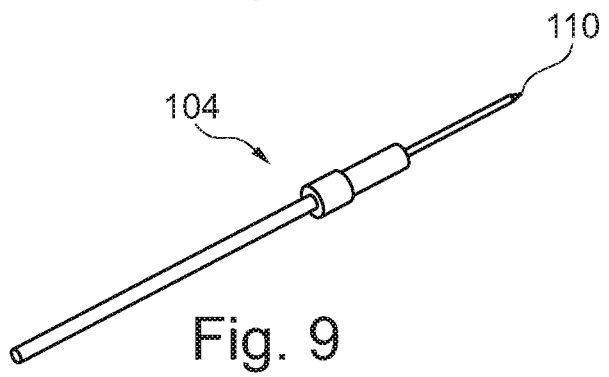
FIG. 9 shows an emitter capillary of the interface device of FIG. 8.
Figure 10:
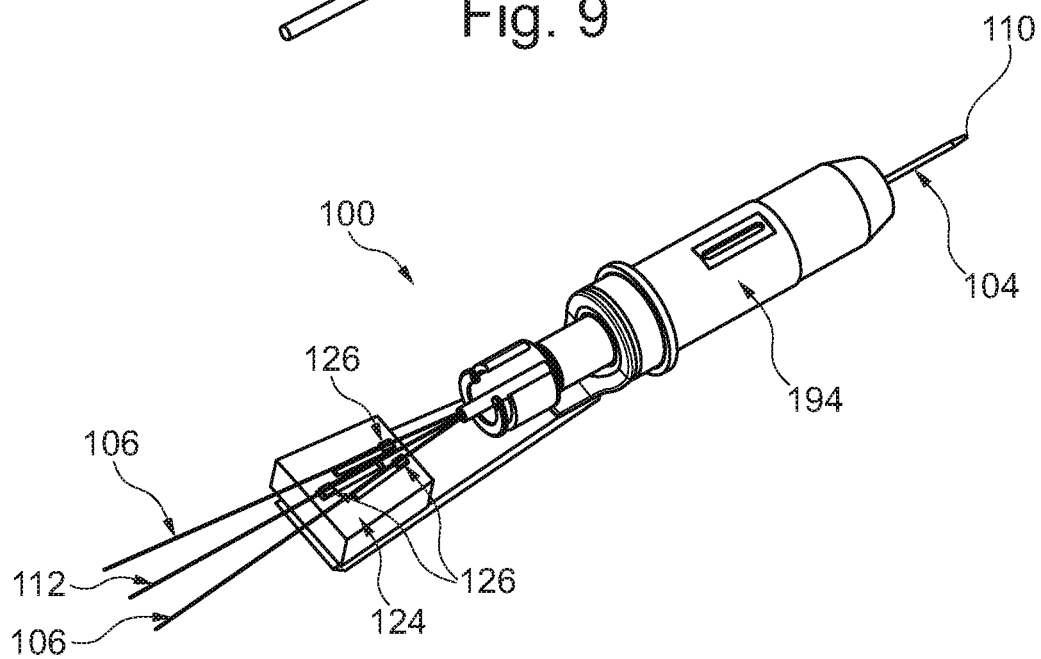
FIG. 10 shows a three-dimensional view of the interface device according to FIG. 8 and FIG. 9.

FIG. 8 shows a three-dimensional cross-sectional view, FIG. 9 shows a partial view, and FIG. 10 shows a three-dimensional view of an interface device 100 according to an exemplary embodiment of the invention.

A drive unit 124 may be implemented in the interface device 100 and may be configured for, simultaneously or sequentially, moving different ones of the sample capillaries 106 in opposite directions (and if desired may also move a sheath fluid capillary 112, which is however optional or can be maintained at a static position with regard to the emitter capillary 104). For example, the drive unit 124 may be configured as a linear actuator.

Furthermore, the interface device 100 may comprise a fastening unit 126 which may be configured for a clamping type fastening or assembly of the sample capillaries 106 and the sheath fluid capillary 112.

FIG. 8 to FIG. 10 demonstrate the compact as well as robust construction of the interface device 100 according to an exemplary embodiment of the invention. In the shown embodiment, the emitter capillary 104 with the sample capillaries 106 and the sheath fluid capillary 112 in an interior thereof can be accommodated and protected in an interior of a housing 194. The fastening unit 126 enables a user to assemble or substitute the sample capillaries 106 and the sheath fluid capillary 112 by a simple clamping operation without the danger of an erroneous assembly. The correspondingly mounted sample capillaries 106 can be moved in a simple way in a forward and backward direction by the drive unit 124. The drive unit 124 can be a linear drive configured as step motor. Alternatively, it is also possible to carry out the movement of the sample capillaries 106 within the emitter capillary 104 manually by a user. In such an embodiment, it is possible to provide one or more stopper units which may render an undesired excessive forward movement or backward movement of the sample capillaries 106 mechanically impossible. By taking this measure, the interface device 100 may be safely prevented from damage even in terms of a manual operation.

Referring to FIG. 10, the movement of the sample capillaries 106 in the interior 114 of the emitter capillary 104 can be for instance carried out by a linear slide using a linear step motor. Alternatively, it is possible to carry out a manual displacement of the sample capillaries 106 manually by a user. In this configuration it can be advantageous to provide the interface device 100 with stopper units (not shown in FIG. 10) which disable an excessive displacement of the sample capillaries 104 in a front side or back side direction. In this way, the safety of operation of the interface device 100 may be improved.

Descriptively speaking, FIG. 8 to FIG. 10 show a setup of a "multi Capillary Nano CE-ESI-MS" with two parallel sample capillaries 106 configured for capillary electrophoresis. The emitter needle or emitter capillary 104 may be inserted into an adapter (which may be made for example of PEEK, Polyetheretherketone) which may also hold a tubing (which may be made for example of PTFE, Polytetrafluoroethylene) to funnel the capillaries 106, 112 inside the emitter capillary 104. For instance, the emitter dimensions may be 1.2 mm inner diameter and 1.6 mm outer diameter, and the tip diameter of the emitter capillary 104 may be for instance 50 μm. The sample capillaries 106 may have an outer diameter of 360 μm and an inner diameter of 25 μm. The sheath capillary 112 may have an outer diameter of 360 μm and an inner diameter of 100 μm. The ends of the sample capillaries 106 may be tapered to a tip with an outer diameter of 70 μm and a cone angle of 12°. Thus, the capillaries 106, 112 easily fit inside the emitter capillary 104.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:
1. An interface device for providing a fluidic interface between a sample separation device and a mass spectrometer, the interface device comprising:
   an emitter capillary; and
   a plurality of sample capillaries being movably arranged within the emitter capillary and configured to transfer fluidic sample from the sample separation device to the mass spectrometer, wherein each of the sample capillaries is coupled with a high voltage switch configured to selectively couple the respective sample capillary with a high voltage source or selectively decouple the respective sample capillary from the high voltage source.

2. The interface device according to claim 1, wherein each of the sample capillaries is movable between an activation position, in which a sample outlet opening of the respective sample capillary is arranged at an emission opening of the emitter capillary, and a deactivation position, in which the sample outlet opening of the respective sample capillary is retracted with regard to the emission opening of the emitter capillary.

3. The interface device according to claim 1, comprising a sheath fluid supply unit configured to supply sheath fluid to the emitter capillary.

4. The interface device according to claim 3, comprising a sheath fluid capillary, wherein the sheath fluid supply unit is configured to provide sheath fluid of such an amount that a flow rate of the sheath fluid through the sheath fluid capillary is higher than a flow rate of fluidic sample through at least one of the sample capillaries.

5. The interface device according to claim 3, wherein the sheath fluid supply unit comprises a sheath fluid capillary within the emitter capillary for providing the sheath fluid to an interior of the emitter capillary.

6. The interface device according to claim 3, wherein the sheath fluid supply unit comprises a sheath fluid supply conduit leading into the emitter capillary for supplying the sheath fluid to an interior of the emitter capillary.

7. The interface device according to claim 1, wherein the sample capillaries are arranged parallel to one another in an interior of the emitter capillary.

8. The interface device according to claim 1, configured for providing a fluidic interface between an electrophoresis sample separation device and the mass spectrometer.

9. The interface device according to claim 1, configured for providing a fluidic interface between a chromatography sample separation device and the mass spectrometer.

10. The interface device according to claim 1, comprising at least one of the following features:
    wherein the emitter capillary and the sample capillaries are configured so that, upon moving a sample outlet opening of a respective sample capillary to an emission opening of the emitter capillary, fluidic sample flows out of the sample capillary and is ionized;
    wherein one end of the emitter capillary comprises an emission opening for emitting an electrospray created based on the fluidic sample, and an opposing other end of the emitter capillary comprises a drain opening for draining excessive sheath fluid and/or fluid flowing out of at least one presently deactivated sample capillary of the sample capillaries;
    wherein one end of the emitter capillary comprises an emission opening for emitting an electrospray created based on the fluidic sample, and an opposing other end of the emitter capillary comprises a drain opening for draining excessive sheath fluid and/or fluid flowing out of at least one presently deactivated sample capillary of the sample capillaries, and wherein the drain opening is larger than the emission opening;
    wherein the sample capillaries are configured to be movable in a coordinated way in opposite directions so that, when a respective one of the sample capillaries has its sample outlet opening at an emission opening of the emitter capillary, a sample outlet opening of another of the sample capillaries is retracted with respect to the emission opening;
    comprising a drive unit for individually moving a respective one of the sample capillaries relative to the emitter capillary;
    comprising a fastening unit configured for fastening the sample capillaries;
    comprising a clamping unit configured for clamping the sample capillaries;
    wherein an inner diameter (D) of the emitter capillary is smaller than a value selected from the group consisting of: 2 mm; and 1.5 mm;
    wherein an outer diameter (d) of the sample capillaries is smaller than a value selected from the group consisting of: 600 μm; and 400 μm;
    configured as an electrospray interface device;
    wherein an emission opening of the emitter capillary has a tapering end with a sharp tip;
    wherein at least one of the sample capillaries has a tapering end with a sharp tip for an outflow of fluidic sample;
    comprising a sheath fluid capillary comprising a cylindrical end for an outflow of sheath fluid;
    comprising a control unit configured for controlling a coordinated movement of each of the sample capillaries with respect to the emitter capillary.

11. An analysis arrangement, comprising:
    a sample separation device configured to separate a fluidic sample;
    a mass spectrometer configured to analyze the separated fluidic sample; and
    the interface device according to claim 1, configured to transfer the fluidic sample from the sample separation device to the mass spectrometer.

12. The analysis arrangement according to claim 11, wherein the interface device is configured to operate the sample capillaries in a coordinated way for an alternating or simultaneous operation of the sample capillaries for transferring fluidic sample to the mass spectrometer.

13. The analysis arrangement according to claim 11, comprising a further sample separation device for separating a further fluidic sample, wherein the sample separation device is connected to at least one of the sample capillaries and the further sample separation device is connected to at least another one of the sample capillaries.

14. The analysis arrangement according to claim 13, comprising one of the following features:
    the sample separation device and the further sample separation device are both electrophoresis sample separation devices;
    the sample separation device and the further sample separation device are both capillary electrophoresis sample separation devices;
    the sample separation device and the further sample separation device are both chromatography sample separation devices;
    the sample separation device and the further sample separation device are both liquid chromatography sample separation devices;
    the sample separation device and the further sample separation device are both nano liquid chromatography sample separation devices;
    the sample separation device is an electrophoresis sample separation device, and the further sample separation device is a chromatography sample separation device.

15. The analysis arrangement according to claim 11, wherein the sample separation device comprises at least one of the following features:
- a sample separation unit configured for separating the fluidic sample in a mobile phase into fractions;
- a chromatography sample separation unit configured for separating the fluidic sample in a mobile phase into fractions;
- a chromatography separation column configured for separating the fluidic sample in a mobile phase into fractions;
- the sample separation device is configured for analysis of at least one physical, chemical and/or biological parameter of at least one fraction of the fluidic sample;
- the sample separation device comprises at least one selected from the group consisting of: a device for chemical, biological and/or pharmaceutical analysis; an electrophoresis sample separation device; a capillary electrophoresis sample separation device; a chromatography device; a liquid chromatography device; and an HPLC device;
- the sample separation device is configured as a microfluidic device;
- the sample separation device is configured as a nanofluidic device;
- the sample separation device comprises a detector for detecting separated fractions of the fluidic sample;
- the sample separation device comprises an injector for injecting the fluidic sample into a mobile phase.

16. A method of transferring fluidic sample from a sample separation device to a mass spectrometer, the method comprising:
- providing a plurality of sample capillaries within an emitter capillary, the emitter capillary comprising an emission opening;
- moving a presently activated one of the plurality of sample capillaries towards the emission opening in such a way that a sample outlet opening of the activated sample capillary is aligned with the emission opening for transferring fluidic sample from the sample separation device to the mass spectrometer by the activated sample capillary; and
- selectively coupling one or more of the plurality of sample capillaries with a high voltage source, and selectively decoupling other sample capillaries of the plurality of sample capillaries, by operating a high voltage switch coupled between the plurality of sample capillaries and the high voltage source.

17. The method according to claim 16, comprising at least one of the following features:
- wherein the method comprises, after having transferred the fluidic sample, moving the presently activated sample capillary relative to the emitter capillary so that the sample outlet opening of the presently activated sample capillary is moved away from the emission opening;
- wherein the method comprises, after having transferred the fluidic sample, moving a previously deactivated one of the sample capillaries for activation towards the emission opening of the emitter capillary, so that a sample outlet opening of the sample capillary to be activated is moved towards the emission opening for transferring further fluidic sample from the sample separation device or from a further sample separation device to the mass spectrometer by the sample capillary to be activated.

18. The interface device according to claim 2, comprising a sheath fluid supply conduit configured to supply sheath fluid to the emitter capillary, the sheath fluid supply conduit comprising a sheath fluid outlet opening positioned, relative to a longitudinal axis of the interface device, between the sample outlet opening of one or more of the plurality of sample capillaries located at the activation position and the sample outlet opening of one or more other sample capillaries of the plurality of sample capillaries located at the deactivation position.

* * * * *